United States Patent
Merrick et al.

(10) Patent No.: US 9,366,018 B1
(45) Date of Patent: Jun. 14, 2016

(54) LONG SPAN STADIUM RISER SYSTEM

(71) Applicant: Dant Clayton Corporation, Louisville, KY (US)

(72) Inventors: Bruce C. Merrick, Louisville, KY (US); Henry L. Nichols, IV, Crestwood, KY (US)

(73) Assignee: Dant Clayton Corporation, Louisville, KY (US)

( * ) Notice: Subject to any disclaimer, the term of this patent is extended or adjusted under 35 U.S.C. 154(b) by 0 days.

(21) Appl. No.: 14/560,828

(22) Filed: Dec. 4, 2014

(51) Int. Cl.
*E04B 1/24* (2006.01)
*E04C 3/00* (2006.01)
*E04H 3/10* (2006.01)

(52) U.S. Cl.
CPC ... *E04B 1/24* (2013.01); *E04C 3/00* (2013.01); *E04H 3/10* (2013.01); *E04B 2001/2409* (2013.01); *E04B 2001/2436* (2013.01); *E04B 2001/2448* (2013.01)

(58) Field of Classification Search
CPC .............. E04B 1/24; E04B 2001/2436; E04B 2001/2448; E04B 2001/2409; E04C 3/00; E04H 3/10
USPC ............... 52/188, 190, 191, 189, 182, 381, 8, 52/580, 592.1
See application file for complete search history.

(56) References Cited

U.S. PATENT DOCUMENTS

| | | | | |
|---|---|---|---|---|
| 2,682,938 A * | 7/1954 | MacDonald | ............ | E04C 2/292 52/590.2 |
| 3,100,556 A * | 8/1963 | De Ridder | .............. | F16B 5/008 52/283 |
| 3,110,371 A * | 11/1963 | De Ridder | .............. | F16B 5/008 105/422 |
| 3,182,769 A * | 5/1965 | De Ridder | ................ | E04C 2/40 108/64 |
| 4,362,429 A * | 12/1982 | Puccio | .................... | E01D 19/06 215/320 |
| 5,159,788 A * | 11/1992 | Merrick | .................... | E04H 3/12 52/8 |
| 5,342,110 A * | 8/1994 | Merrick | .................... | A47C 1/12 297/232 |
| 5,651,154 A | 7/1997 | Ahlskog et al. | | |
| 5,819,491 A * | 10/1998 | Davis | ....................... | C08L 23/10 52/100 |
| 6,076,936 A * | 6/2000 | George | ................... | F21S 8/032 362/146 |
| 6,438,909 B2 * | 8/2002 | Birch | .............................. | 156/64 |
| 7,047,699 B2 * | 5/2006 | Kennedy | ................... | B32B 3/02 52/181 |
| 7,073,297 B2 * | 7/2006 | Grinstead | ........... | E04F 11/1045 52/182 |

(Continued)

FOREIGN PATENT DOCUMENTS

| | | | | |
|---|---|---|---|---|
| GB | 2115852 | * | 9/1983 | ................ E04H 3/10 |
| JP | 2003/262021 | * | 9/2003 | ................ E04H 3/10 |
| WO | WO-2010/028476 | * | 3/2010 | ................ E04H 3/10 |

OTHER PUBLICATIONS

Intelligent Engineering (UK) Ltd., http://www.ie-sps.com; 2 page printout from web entitled Stadia Terraces.

*Primary Examiner* — Brent W Herring
(74) *Attorney, Agent, or Firm* — Woodard, Emhardt, Moriarty, McNett & Henry, LLP

(57) ABSTRACT

An L-shaped module for construction of tiered stadium seating is provided. The module is formed from a plurality of hollow extrusions that are longitudinally welded to form a riser portion and a runner portion. The riser portion rises vertically from a connection to the runner portion. The interior of the extrusions may be used as concealment spaces for hardware or to aid in fluid drainage. Connections to a support structure may be spaced at distances of 20 feet or greater.

4 Claims, 8 Drawing Sheets

(56) References Cited

U.S. PATENT DOCUMENTS

| | | | | |
|---|---|---|---|---|
| 8,240,104 B2 * | 8/2012 | Koikas | E04B 2/8629 52/479 |
| 8,266,842 B2 * | 9/2012 | Merrick | E04B 1/4107 52/188 |
| 8,869,461 B1 * | 10/2014 | Ferry | E04H 3/12 52/188 |
| 2004/0010981 A1 * | 1/2004 | Kennedy | B32B 3/02 52/6 |
| 2008/0083170 A1 * | 4/2008 | Staten | E04H 3/123 52/10 |
| 2010/0024327 A1 * | 2/2010 | Kennedy | B29C 53/063 52/182 |
| 2011/0167736 A1 | 7/2011 | Vincent | |
| 2011/0277390 A1 * | 11/2011 | Merrick | E04B 1/4107 52/8 |
| 2012/0167521 A1 * | 7/2012 | Cretti | E04F 11/022 52/741.2 |
| 2014/0325920 A1 * | 11/2014 | Ugolini | E04H 3/12 52/6 |

\* cited by examiner

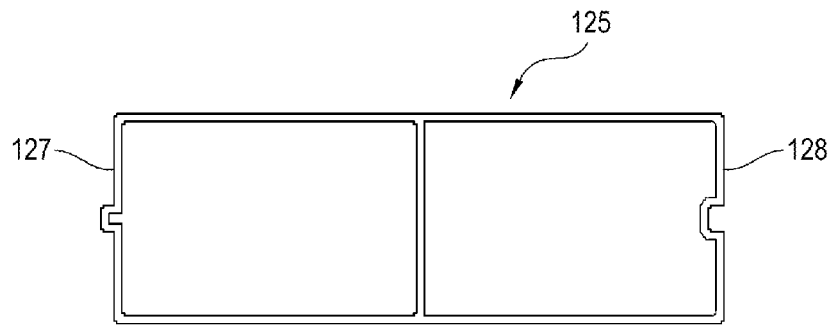
*Fig. 3*
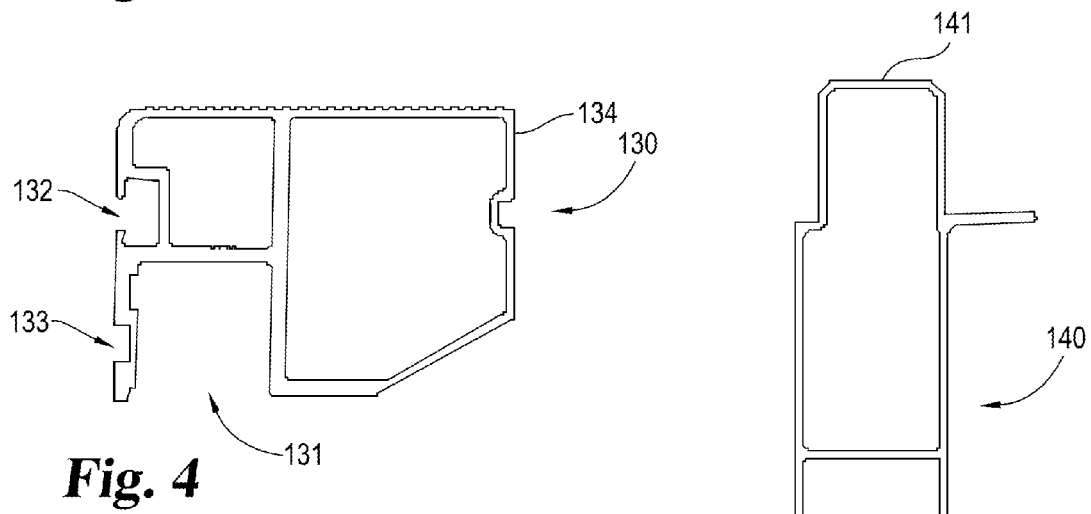
*Fig. 4*
*Fig. 5*
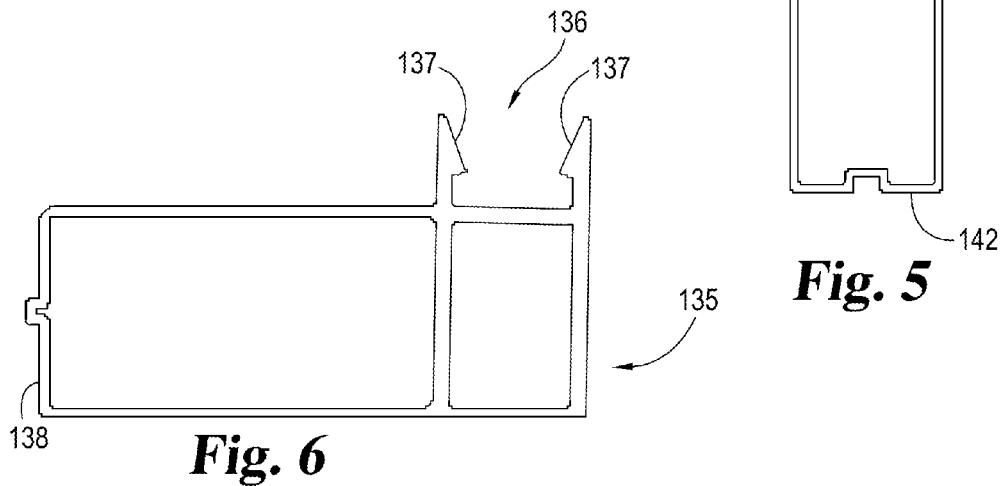
*Fig. 6*

LONG SPAN STADIUM RISER SYSTEM

BACKGROUND

The present invention generally relates to modules used to construct tiered seating structures. Tiered seating structures are used in stadiums and arenas to provide seating for spectators. These structures include an underlying support structure that holds a runner and riser assembly. The runner and riser assembly provides an area on which people may walk on the seating structure and provides a base for attachment of seats or bleachers.

Often, these runner and riser assemblies are constructed as precast construction modules that are shipped to the installation site and then assembled on-site. Traditionally, the seating structures have been formed from concrete, creating modules that are very heavy. The modules could be made smaller, but this increases the time and labor needed for installation.

Making the runner and riser modules from metal can reduce the weight of the modules and make installation of the modules quicker and easier. However, metal seating is typically confined to smaller scale bleacher structures, as larger scale metal structures become less cost effective. Thus, there is a need for improvement in this field.

SUMMARY

In one embodiment, a module for a tiered seating structure is shown. The module includes a runner portion made from hollow extrusions that are joined by welding. The runner portion includes a front and a rear extrusion and at least one intermediate extrusion. The module also includes a riser portion formed from a plurality of hollow extrusions that are joined by welding. The riser portion connects to the rear extrusion of the runner portion and extends vertically. Connection points are used to attach the module to a support surface. The connection points are spaced at a distance of at least 20 feet.

Other embodiments include additional optional features. For example, in some embodiments, the module includes an electrical conduit that extends through the hollow interior of the rear end extrusion of the runner portion. Drain openings in the rear end extrusion allow water to be removed from the top surface of the runner portion by draining the water into the hollow interior of the rear end extrusion Also, the intermediate extrusions of the runner portion are filled with a sound deadening material.

Another embodiment may include a method for building an apparatus for tiered seating. The method comprises providing hollow extrusions and then forming a runner section and a riser section by welding the hollow extrusions together. The riser section is then attached to an end of the runner section to form a modular segment. The modular segment is connected to a support structure at connection points.

Further forms, objects, features, aspects, benefits, advantages, and embodiments of the present invention will become apparent from a detailed description and drawings provided herewith.

BRIEF DESCRIPTION OF THE DRAWINGS

FIG. 3 is a side view of an intermediate hollow extrusion from the runner portion of the module of FIG. 1.

FIG. 4 is a side view of a front end extrusion from the runner portion of the module of FIG. 1.

FIG. 5 is a side view of an upper end extrusion from the riser portion of the module of FIG. 1.

FIG. 6 is a side view of a rear end extrusion from the runner portion of the module of FIG. 1.

DESCRIPTION OF THE SELECTED EMBODIMENTS

Figure 1:
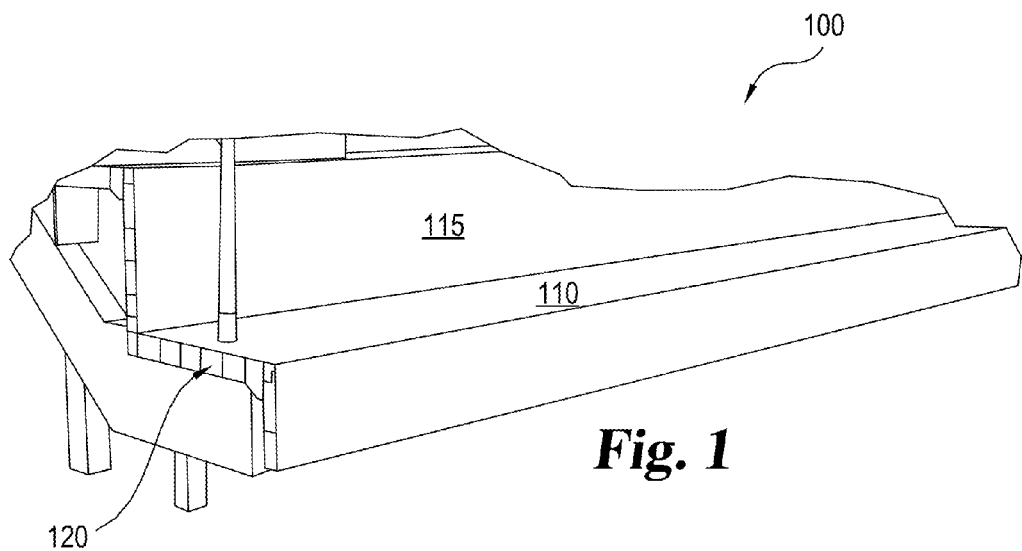
FIG. 1 is a perspective view of an embodiment of a module for a tiered seating structure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows an embodiment of a module 100 for a tiered seating structure. Module 100 includes a runner portion 110 and a riser portion 115. Runner portion 110 is connected to riser portion 115 to form an L-shape. Runner portion 110 extends horizontally while riser portion 115 extends vertically.

Runner portion 110 and riser portion 115 are made of hollow extrusions 120. Although not required, hollow extrusions 120 may have multiple interior compartments. In some embodiments hollow extrusions 120 are made from extruded aluminum. However, in other embodiments, different materials may be used to form hollow extrusions 120. For example, hollow extrusions 120 may be made of a different metal other than aluminum or may be made from plastic.

The term aluminum means here any materials that are 100% aluminum and also aluminum alloys. As an example, the term aluminum can refer to 6063 aluminum alloy or 6061 aluminum alloy. The term hollow is used to refer to any structure that includes a void or empty space in at least a portion of its interior. This void or empty space may or may not be completely surrounded by material.

Figure 2:
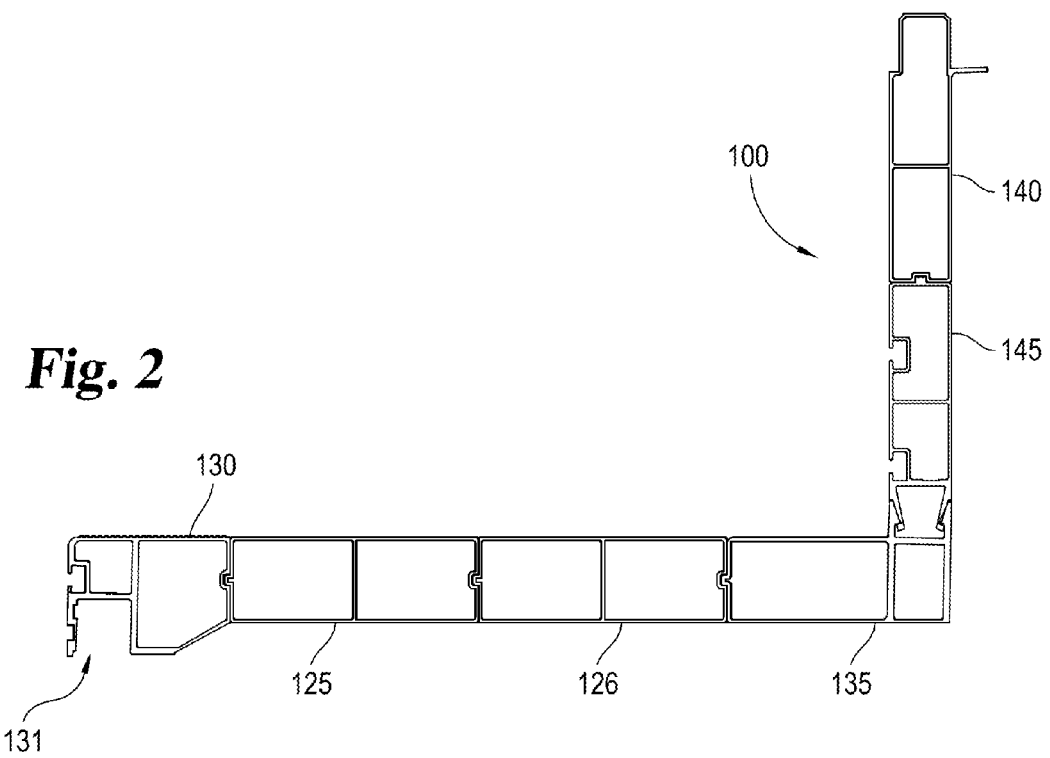
FIG. 2 is a side view of the module of FIG. 1.

As seen in FIG. 2, runner portion 110 and riser portion 115 are made from a plurality of hollow extrusions 120. Runner portion 110 includes a front end extrusion 130 and a rear end extrusion 135. Riser portion 115 includes an upper end extrusion 140 and a lower end extrusion 145. In other embodiments, riser portion 115 may be formed from a single extrusion.

Runner portion 110 also has intermediate extrusions that are positioned between the end extrusions. In the embodiment shown in FIG. 2, runner portion 110 includes intermediate extrusions 125, 126 where one end of intermediate extrusion 125 is connected to an end of intermediate extrusion 126. Intermediate extrusion 125 connects to front end extrusion 130 and intermediate extrusion 126 connects to rear end extrusion 135. Each intermediate extrusion 125, 126 has two interior, hollow compartments. As shown in FIG. 3, intermediate extrusion 125 also includes two wall surfaces 127, 128 on opposite sides of extrusion 125. Wall surfaces 127, 128 are contact points for other extrusions that are connected to intermediate extrusion 125 to form runner portion 110.

The use of multiple extrusions to form runner portion 110 and riser portion 115 is more cost effective than forming runner portion 110 and riser portion 115 from a single, large extrusion. The use of multiple extrusions also allows variability of the geometry of these sections without greatly affecting the cost to build the module. It is possible to change the width of runner portion 110 or riser portion 115 by changing the width of just one of its extrusions. For example, to change the width of runner portion 110 by one inch, the width of intermediate extrusion 126 can be modified by one inch while the rest of the extrusions have the same dimensions. If runner portion 110 were cast or made of only one extrusion, a new extruder would have to be developed for the entire runner portion 110 at much greater cost than modifying an extruder just for intermediate extrusion 126.

Although the width of intermediate extrusion 126 is changed in the example above, the width of any of the extrusions 125, 126, 130, 135 may be changed to adjust the overall width of runner portion 110. The height of extrusions 140, 145 may also be changed to adjust the overall height of riser portion 115.

Other embodiments may include different numbers of intermediate extrusions in runner portion 110. Changing the number of intermediate extrusions could change the dimensions of runner portion 110 giving the seating structure either more or less leg room for spectators. For example, there could only be one intermediate extrusion or there could be more than two intermediate extrusions. It is also not required that intermediate extrusions 125, 126 have multiple hollow compartments. Some embodiments may have extrusions that do not have multiple compartments while other embodiments may have three or more compartments within one extrusion.

Although not shown in FIG. 2, riser portion 115 may also be modified to be constructed from a single extrusion. Alternatively, intermediate extrusions may be connected between upper end extrusion 140 and lower end extrusion 145 to create a riser portion 115 with more than two extrusions. The height of the end extrusions 140, 145 may be reduced to make room for an intermediate extrusion, or an intermediate extrusion may be added to increase the height of riser portion 115.

As illustrated in FIG. 4, front end extrusion 130 includes a connection point to the top of a riser portion from another L-shaped module. In the embodiment shown, this connection point has an opening 131 on the bottom surface of runner portion 110 that faces downward. A connection portion 141 of the upper end extrusion 140 (see FIG. 5) of a riser portion from a separate module fits into opening 131. The separate module may be secured to front end extrusion 130 of module 100. The attached riser portion may be secured by a variety of methods including screws or a snap connection. If screws are used to attach a riser portion from another module, the screw may be attached within opening 133. A cover may be snapped into channel 132 and extended over opening 133 to hide the exposed screw heads. Wall surface 134 is on the opposite side of the face of front end extrusion 130 that includes 133. When assembled in runner portion 110, wall surface 134 contacts wall surface 127 of intermediate extrusion 125. Front end extrusion 130 also includes an upper attachment channel 132 that extends along the length of front extrusion 130. Optionally, a snap fitting cover may be inserted into upper attachment channel 132 to cover channel 132 so it is not exposed.

An upper end extrusion 140 is shown in FIG. 5. On one end, upper end extrusion 140 includes connection portion 141 that fits within opening 131 to connect one module 110 to other modules. Wall surface 142 is located on the other end of upper end extrusion 140 and contacts lower end extrusion 145 when assembled to form riser portion 115.

Figure 7:
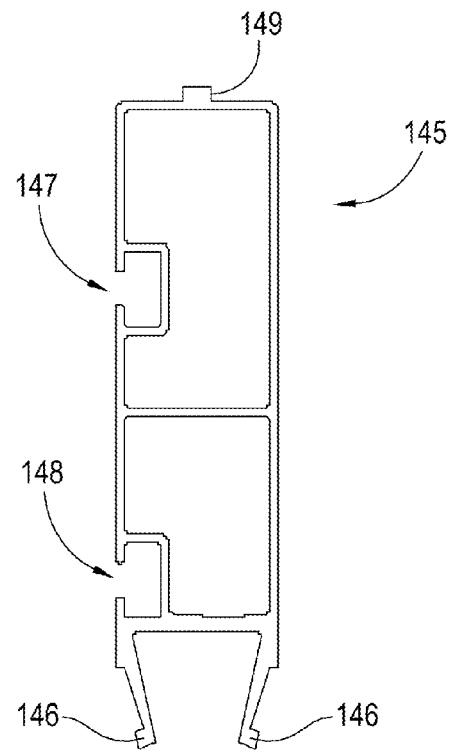
FIG. 7 is a side view of a lower end extrusion from the riser portion of the module of FIG. 1.

As seen in FIG. 6, rear end extrusion 135 includes a connection point to the bottom of riser portion 115. In the embodiment shown, this connection point is an opening 136 extending upward from the top surface of runner portion 110. The bottom of riser portion 115 fits into opening 136 where it is secured to rear end extrusion 135. As an example, riser portion 115 may be secured by a snap connection as shown in FIG. 2; however, other connection methods may be used. Rear end extrusion 135 has notches 137 that extend into opening 136. Arms 146 on lower end extrusion 145 of riser portion 115 (see FIG. 7) are fit into opening 136 and deflected inward by notches 137. Arms 146 are pushed into opening 136 until they clear notches 137 and snap outward to fit underneath notches 137. Other embodiments may attach riser portion 115 to runner portion 110 using any other type of connection mechanism that would provide a secure attachment. For example, runner portion 110 and riser portion 115 may be attached using screws.

Wall surface 138 is located on the opposite side of rear end extrusion 135 when compared to the position of opening 136. When assembled in a runner section 110, wall surface 128 abuts a wall surface of intermediate extrusion 126.

A middle attachment channel 147 and a lower attachment channel 148 are included on lower end extrusion 145. Each channel 147, 148 extends the length of lower end extrusion 145. Channels 147, 148 may be used in combination with upper attachment channel 132 to aid in erection of the modules onto a tiered seating structure. Connection apparatus used to lift the modules to the desired height on the seating structure may be attached to channels 132, 147, 148. Attaching the connection apparatus at the upper attachment channel 132 in addition to the middle attachment channel 147 and the lower attachment channel 148 allows for better balance as module 100 is being lifted. Channels 132, 147, and 148 may also be used as connection points for mounting seats, aisle step attachments, and aisle handrails. When not in use, channels 147, 148 may be covered with a covering snapped into the channels.

Lower end extrusion 145 also includes a wall surface 149 that is located on the opposite end of arms 146. Wall surface 149 abuts wall surface 142 of upper end extrusion 140 when lower end extrusion 145 and upper end extrusion 140 are connected to form riser portion 115.

Each wall surface 127, 128, 134, 138, 142, or 149 is designed to abut a corresponding wall surface from another extrusion when the extrusions are assembled to form runner portion 110 or riser portion 115. In runner portion 110, corresponding wall surfaces contact each other along substantially the entire height of runner portion 110. As an example, in FIG. 8, wall surface 127 contacts wall surface 134, and contact is made for the entire height of runner portion 110. In riser portion 115, the corresponding wall surfaces contact each other along substantially the entire width of riser portion 115. For example, as seen in FIG. 9, wall surface 142 contacts wall surface 149 and contact is made between the surfaces for the entire width of the riser portion 115.

Figure 8:
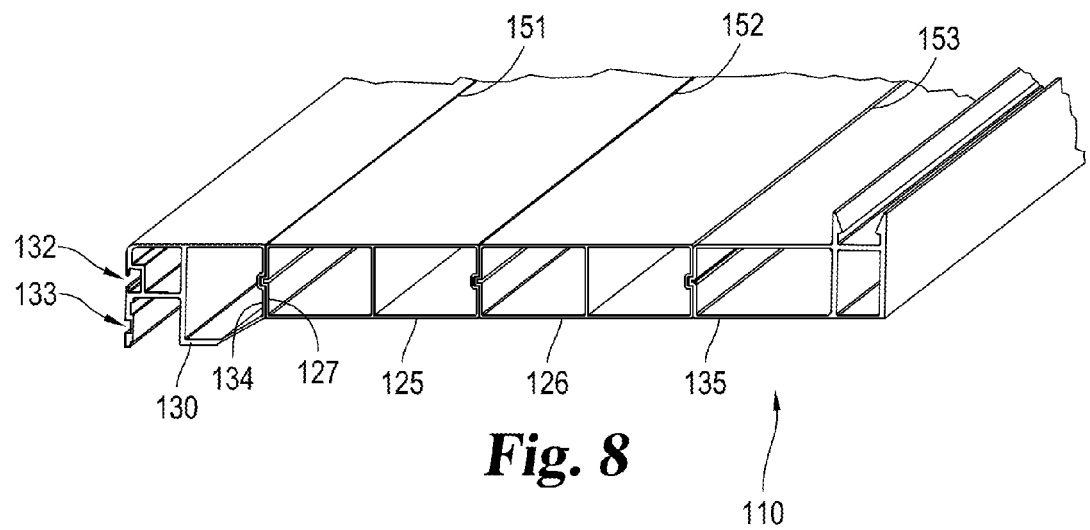
FIG. 8 is a runner portion for the module of FIG. 1.

As shown in FIG. 8, the hollow extrusions 120 that form runner portion 110 are held together with a longitudinal weld that extends the length of the extrusions. For example, intermediate extrusion 125 is attached to front end extrusion 130 by a weld along the length of intersection 151. Front end extrusion 130 and intermediate extrusion 125 are also held together by a weld along their intersection on the bottom surface of runner portion 110 (not shown in FIG. 8). Similarly, intermediate extrusions 125, 126 are welded together along intersection 152 and intermediate extrusion 126 is attached to rear end portion 135 along intersection 153. Corresponding welds on the bottom surface of runner portion 110 are made for each of these intersections. Each weld is located either above or below the location where the wall surfaces of adjacent extrusions contact each other.

The extrusions that form riser section 115 are also attached by welding, similar to the extrusions in runner section 110. As shown in FIG. 9, extrusions 140, 145 are welded together along their length at intersection 156. The extrusions are also welded at their intersection on the opposite side of intersection 156 (not shown).

Figures 9, 10:
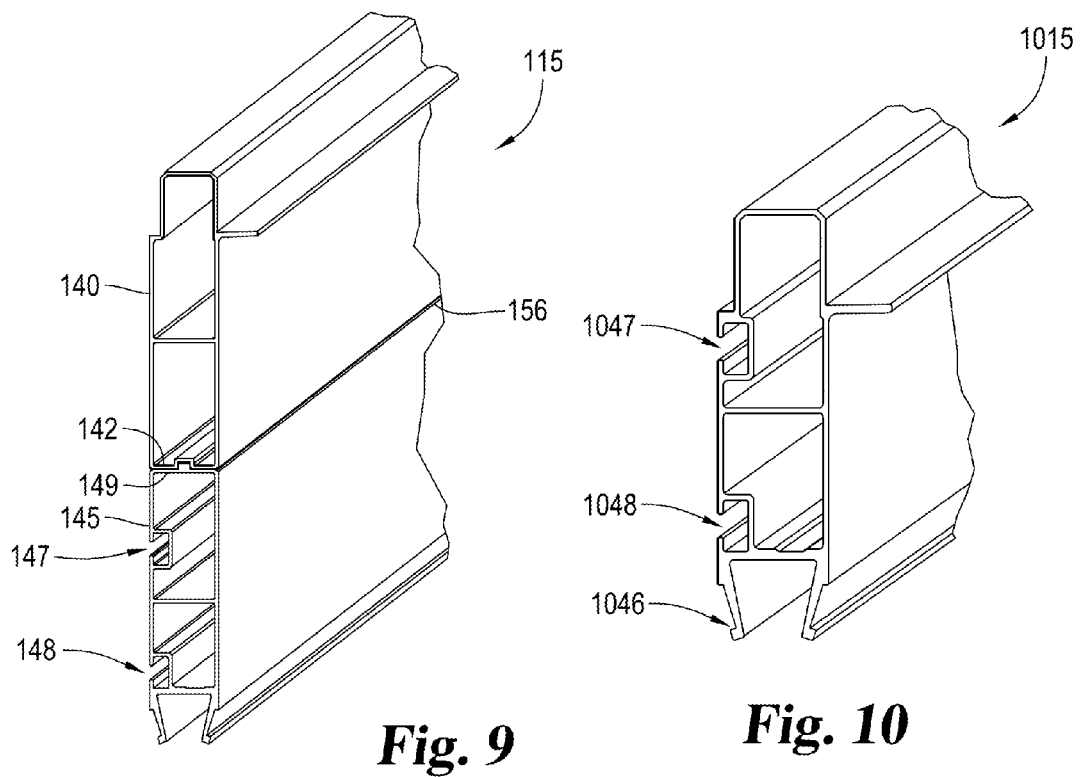
FIG. 9 is a riser portion for the module of FIG. 1.
FIG. 10 is an embodiment of a riser portion for a module for a tiered seating structure.

As shown in FIG. 10, in alternate embodiments, riser section 115 may be formed from a single extrusion 1015. The single extrusion includes arms 1046 that snap into opening 136 of rear end extrusion 135. Extrusion 1015 also includes attachment channels 1047, 1048 that may be used to aid in installation and as an attachment point for seats, handrails, or aisle steps.

Figure 11:
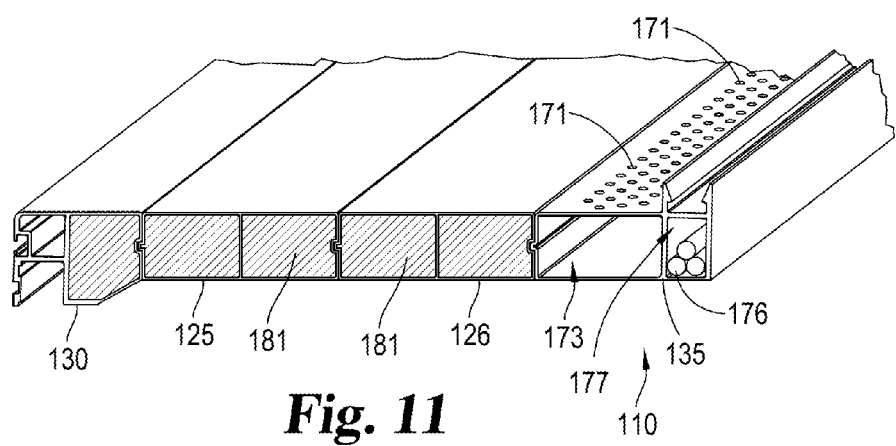
FIG. 11 is an embodiment of the runner portion from FIG. 8 with water conduits, electrical conduits, and sound deadening material in the hollow extrusions.

In an embodiment illustrated in FIG. 11, runner portion 110 includes water conduits 171 in rear end extrusion 135. In this embodiment, water conduits 171 are holes drilled into the top surface of rear end extrusion 135. Rear end extrusion 135 acts as a gutter that removes water or other liquid from the top surface of runner portion 110. Conduits 171 allow water on the top surface of runner portion 110 to drain into the hollow interior 173 of the rear end extrusion 135. Additional water conduits 171 may be added to the bottom surface of rear end extrusion 135 to allow water or other liquids to drain from hollow interior 173. Some embodiments may include a slight slope of the top surface of runner portion 110, causing water on runner portion 110 to run toward water conduits 171.

Although water conduits 171 are shown in the rear end extrusion 135, in other embodiments the position of water conduits 171 may be varied. For example, water conduits 171 may be positioned in front end extrusion 130 or in intermediate extrusion 125.

In some embodiments including multiple connected modules 100 (as an example, see FIG. 12), some of the modules 100 may include water conduits 171 while other modules 100 do not include water conduits 171. For the modules 100 that do include water conduits 171, the runner portion 110 is slightly pitched to slope backward, for example about 1 degree, so water collected on runner portion 110 runs toward water conduits 171. For the modules 100 that do not include water conduits 171, the runner portion 110 is pitched slightly forward, for example about 1degree, to encourage water to run toward a lower level that has water conduits 171 or to the ground.

Also shown in FIG. 11, a portion of rear end extrusion 135 may serve as a storage area for electrical conduits 176. The hollow interior 177 of rear end extrusion 135 is sized to allow electrical conduits 176 to run along its length. The electrical conduit may be wiring, cable, fiber optics, or any other type of power or data conduit.

Conduit 176 may be inserted into interior 177 at one end of rear end extrusion 135 and threaded through its length to the other end. Alternatively, holes may be made in the rear vertical surface of rear end extrusion 135 at any position along its length, and conduit 176 may be inserted into interior 177 at one of these holes.

Sound deadening material 181 may be inserted into the hollow interiors of the intermediate extrusions 125, 126 and a portion of front end extrusion 130. The sound deadening material 181 may be concrete or any other material that can be used as filler to decrease the sound of footsteps on runner portion 110. As shown in FIG. 11, all of the compartments of the interior of extrusions 125, 126 may be filled. However, in other embodiments, only some of the compartments of extrusions 125, 126 may be filled. For example, only one or two of the compartments may be filled. Alternatively, other embodiments may not include any sound deadening material 181.

Figure 12:
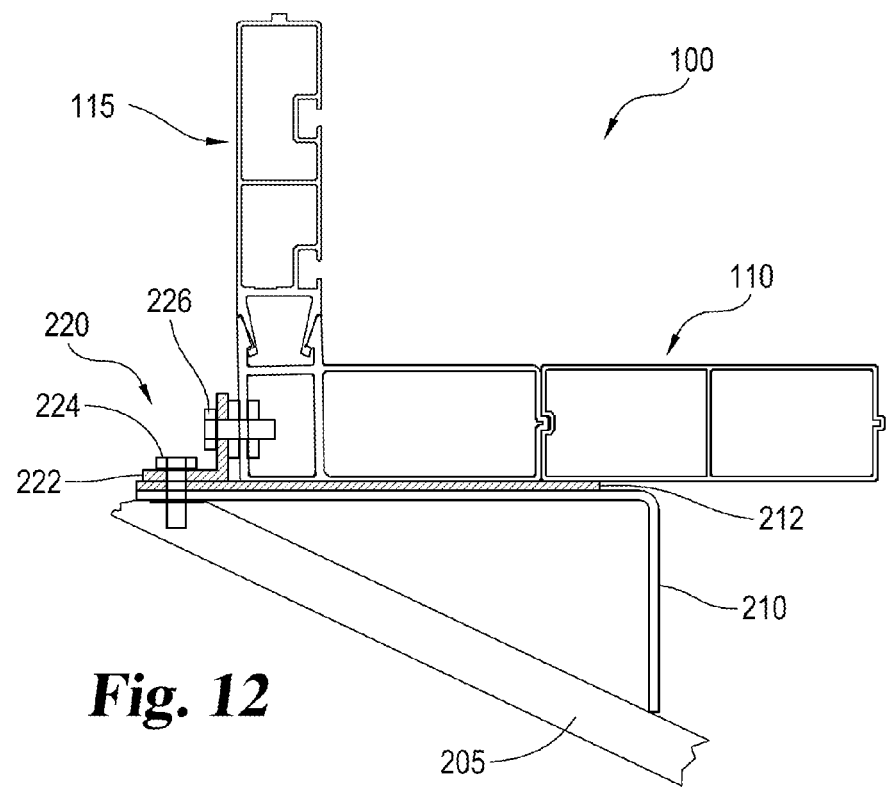
FIG. 12 is the module of FIG. 1 connected to a support structure.

FIG. 12 shows an embodiment of module 100 connected to a support structure 205 at a connection point 220. A support stool 210 is attached to the top of support structure 205 and a bearing plate 212 is attached to the top of support stool 210. Runner portion 110 of module 100 is placed on top of bearing plate 212. One side of an angle bracket 222 rests on bearing plate 212, while the other side of angle bracket 222 is positioned adjacent to rear end extrusion 135. A bolt 224 is inserted through angle bracket 222 and support structure 205 and another bolt 226 is inserted through angle bracket 222 and rear end extrusion 135 to secure module 100 to support structure 205.

The embodiment shown in FIG. 12 is merely an example of a connection point 220 for connecting module 100 to support structure 205. In other embodiments connection point 220 may be any other set up that secures module 100 to support structure 205. For example, connection point may be a clamp that is secured to runner portion 110 and clamps around support structure 205. As another alternative, angle bracket 222 may connect to riser portion 115 instead of runner portion 110.

Figure 13:
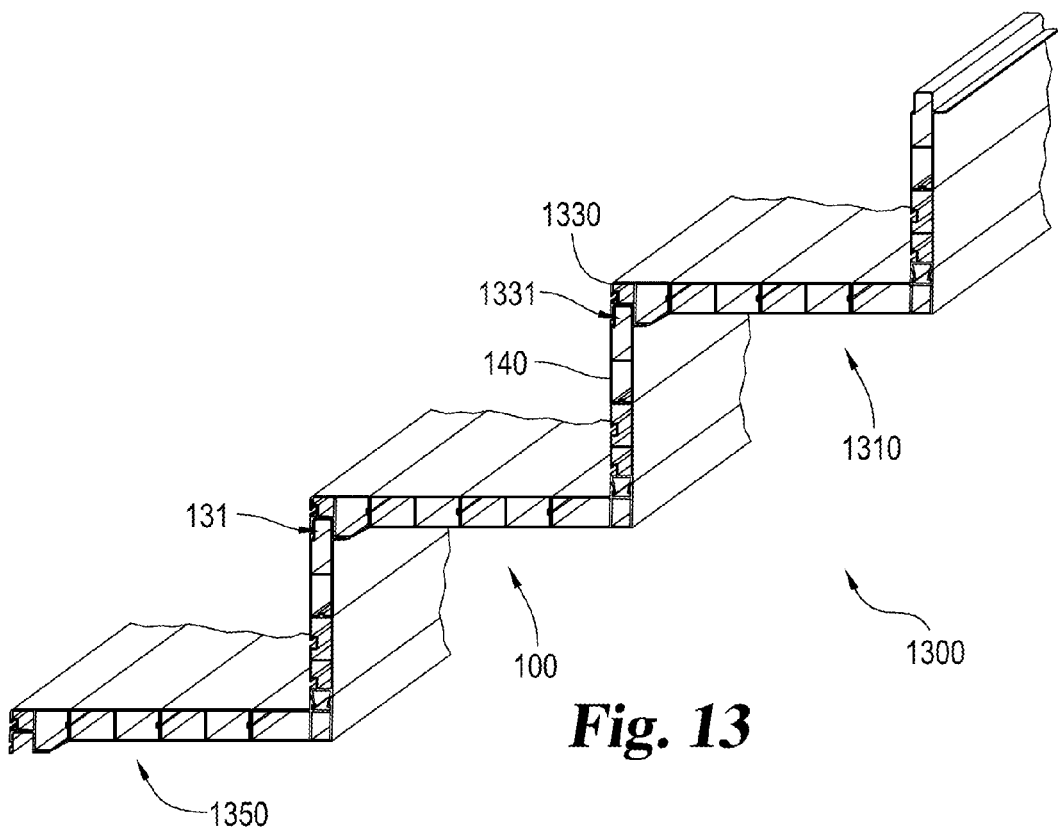
FIG. 13 is the module of FIG. 1 connected in series with other modules.

In some embodiments, module 100 may be attached to other modules in series to create a multi-module, tiered assembly 1300, as shown in FIG. 13. To connect modules 100, 1310 together, upper end extrusion 140 of module 100 fits into opening 1331 of front end extrusion 1330 of module 1310. The modules are then fastened to each other, for example, using screws or a snap connection. Another module 1350 may then be attached to the other end of module 100 by fitting into opening 131. Any additional number of modules may be added in series to achieve a desired height or seating capacity by repeating this method of fastening the upper end extrusion of one module to the opening in the front end extrusion of another module.

Figure 14:
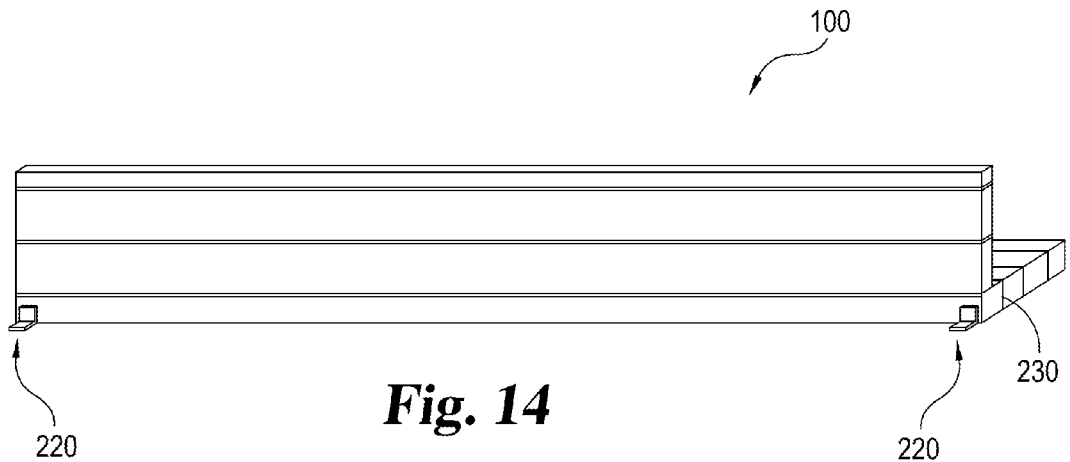
FIG. 14 is a back perspective view of the module of FIG. 1.

The length of module 100 is determined by the length of the hollow extrusions 120 that form runner portion 110 and riser portion 115 of module 100. Support structure 205 provides support to module 100 allowing people to walk and sit on module 100. As seen in FIG. 14, connection points 220 that attach module 100 to support structure 205 may be spaced at the ends of module 100.

In some embodiments the distance between connection points 220 is at least 20 feet, but this distance may be greater than 20 feet. For example there could be 30 feet between connection points 220. Other embodiments may have a different length between connection points, either greater than 30 feet or less than 20 feet. It is also not required that connection points 220 are located at the ends of module 100. Connection points 220 may be placed anywhere along module 100. Other embodiments may also have a different number of connection points 220 on each module 100. For example, a module 100 could have three connection points.

A module 100 may be aligned side-by-side with other modules to create seating structures with a longer length than the length of one module. For example, another module may be attached to module at side 230. These modules may be attached at the sides by a variety of methods, for example by welding or snap connection. The modules may also be unattached at the sides, instead being held in place by adjacent connection points on the support structure. A small gap may be left between the adjacent modules or the modules may be connected so that their side surfaces are flush. A cover strip can be placed on the top surface such that any gap between modules is covered. The strip may be affixed to only one of two adjacent modules, thereby allowing for thermal expansion and contraction.

Figure 15:
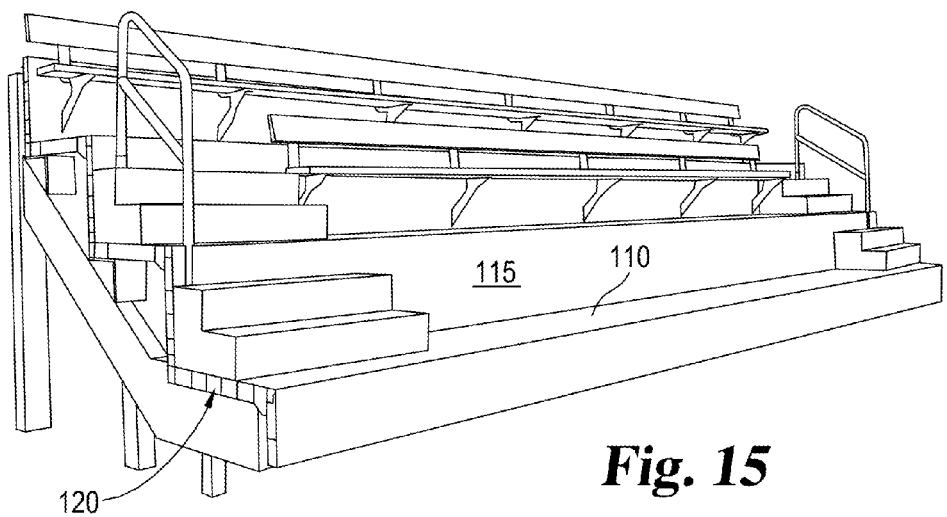
FIG. 15 is a perspective view of the series of modules shown in FIG. 13 with seats, stairs, and handrails attached to the modules.

As seen in FIG. 15, in some embodiments, module 100 may serve as a platform to which bleacher structures attach. Module 100 may include an attachment mechanism on either runner portion 110 or riser portion 115 that allow seats to be mounted on top of module 100. The attachment mechanism may be any mechanism that secures the seats to module 100. For example, the attachment mechanism may be self-tapping screws that connect seats to module 100, bolts that attach the seats, or a snap mechanism. Other optional features such as stairs or railings may also be secured to module 100.

Figure 16:
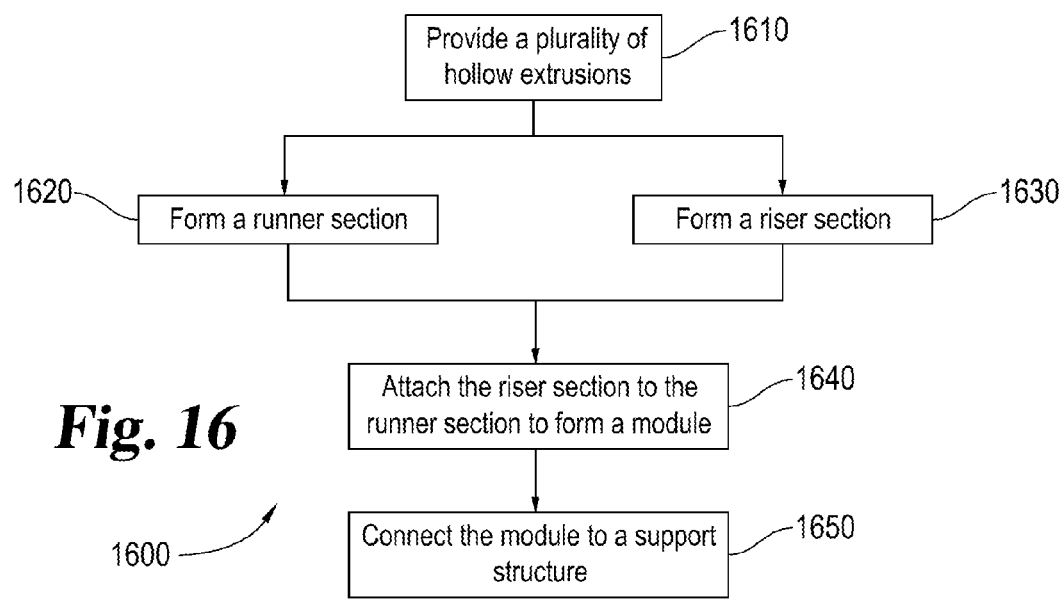
FIG. 16 is a flowchart for an embodiment of a method of building an apparatus for tiered seating.

FIG. 16 illustrates a flow chart 1600 for a method of building an apparatus for a tiered seating structure. First, a user provides 1610 a plurality of hollow extrusions. Next, the user uses the hollow extrusions to form a runner section 1620 that has a front and a rear end extrusion and at least one intermediate extrusion. The extrusions that form the runner section are welded together. The user also forms a riser section 1630 from at least two of the provided hollow extrusions and connects the extrusions by welding. The order in which step 1620 and step 1630 are performed may be switched so the riser section is formed before the runner section.

The user then attaches 1640 the riser section to an end of the runner section, forming an L-shaped modular segment. The user connects 1650 the modular segment to a support structure at connection points.

Figure 17:
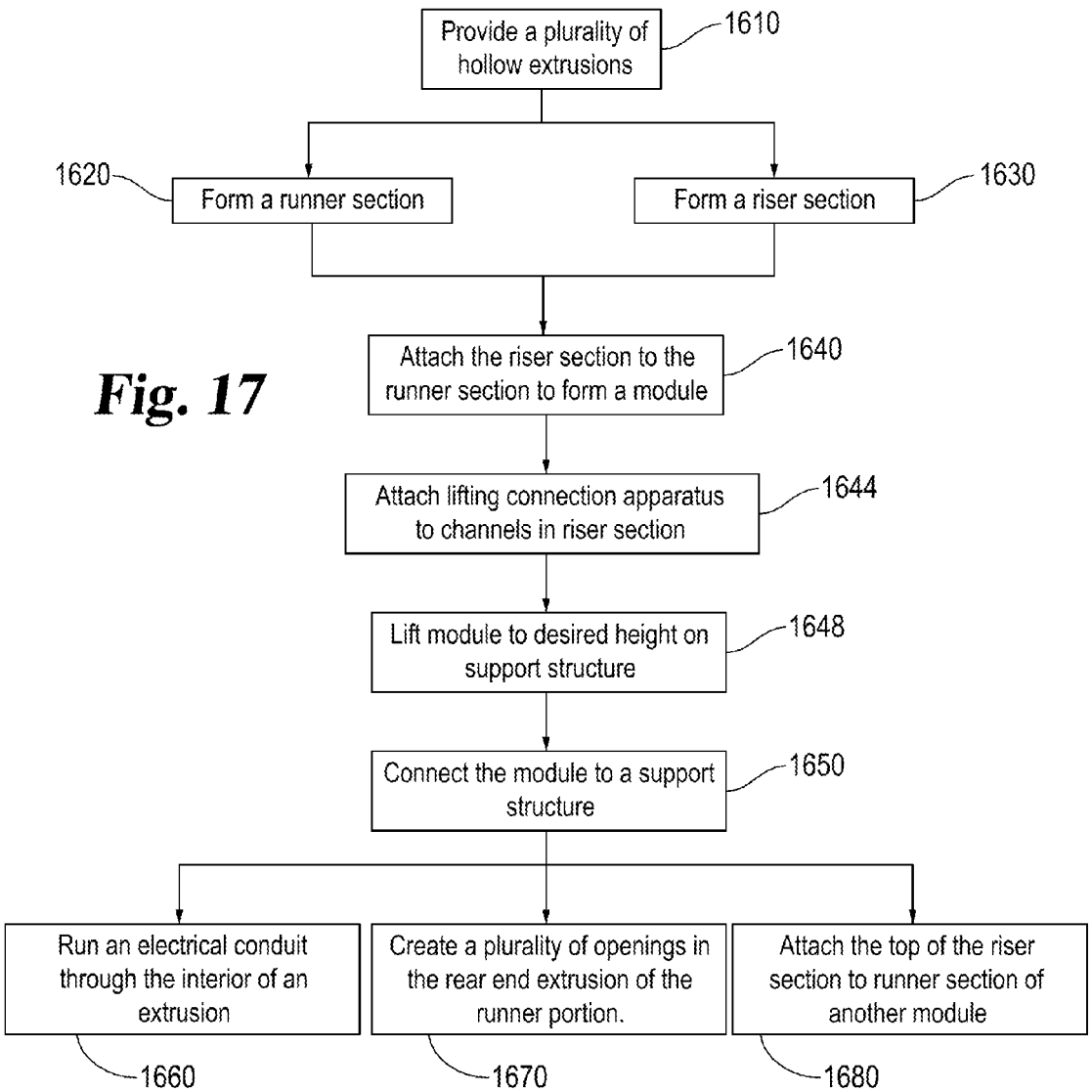
FIG. 17 is a flowchart for an embodiment of a method of building an apparatus for tiered seating.

Other embodiments may include additional steps (see FIG. 17). For example, in these embodiments, after attaching 1640 the riser section to the runner section to form a module, the user then attaches 1644 a lifting connection apparatus to the channels in the extrusions that form the riser section. The modular segment is lifted 1648 to the desired height on the support structure and then connected 1650 to the support structure. Additionally, the user may run 1660 an electrical conduit through the hollow interior of one of the extrusions of the runner section. The user may also create 1670 openings in the top and bottom of the rear end extrusion of the runner portion so the rear end extrusion acts as a drain gutter. A user may also attach 1680 the top of the riser section to the runner section of another constructed modular segment, forming a series of modular segments. The attaching step 1680 may be accomplished by a variety of methods. For example, the front of a runner portion of one module is lapped over the top of the riser portion of another module. The modules are then attached with self-tapping screws that are run along the length of the module.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A tiered seating structure including a tiered assembly of L-shaped modules, comprising:
    a runner portion having a height and a width formed from a plurality of hollow aluminum extrusions wherein said plurality of extrusions includes a front and a rear end extrusion and at least one intermediate extrusion substantially filled with a sound deadening material, wherein each of said extrusions includes a wall surface and wherein said extrusions are joined by welds joining said extrusions located above and below adjacent portions of said wall surfaces of said extrusions;
    a riser portion having a height and a width formed from one or more hollow aluminum extrusions;
    wherein said riser portion connects to said rear end extrusion of said runner portion and extends vertically with respect to said runner portion;
    wherein the portions of said wall surfaces that contact adjacent extrusions in said runner portion are in contact along substantially the entire height of said runner portion;
    an electrical conduit extending through the hollow interior of at least one of said hollow aluminum extrusions in said runner portion;
    connection points for attachment of said tiered assembly of L-shaped modules to an external support surface wherein there is a distance of at least 20 feet between said connection points; and,
    wherein at least one of said L-shaped modules having said rear end extrusion provided with a plurality of drain openings on the top surface communicating inside the hollow interior of said rear extrusion, said top surface of said runner portion sloped rearwardly toward said drain openings, and wherein other of said L-shaped modules having a forwardly sloped top surface of said runner portion.

2. The module of claim 1, wherein said runner portion connects to said riser portion by a snap connection.

3. The module of claim 1, further comprising at least one channel in one of said extrusions in said riser portion, wherein said channel is adapted to receive fasteners for seats.

4. The module of claim 3, further comprising a cover, wherein said cover is adapted to fit over said channel to conceal the fasteners.

* * * * *